United States Patent
Akada et al.

(10) Patent No.: US 7,545,374 B2
(45) Date of Patent: Jun. 9, 2009

(54) IMAGE DISPLAY CONTROL PROGRAM, IMAGE DISPLAY CONTROL METHOD, AND VIDEO GAME DEVICE

(75) Inventors: Isao Akada, Kobe (JP); Naoya Tanabe, Komae (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 314 days.

(21) Appl. No.: 10/540,584

(22) PCT Filed: Dec. 26, 2003

(86) PCT No.: PCT/JP03/17094

§ 371 (c)(1),
(2), (4) Date: Jan. 20, 2006

(87) PCT Pub. No.: WO2004/061777

PCT Pub. Date: Jul. 22, 2004

(65) Prior Publication Data

US 2006/0250398 A1 Nov. 9, 2006

(30) Foreign Application Priority Data

Jan. 7, 2003 (JP) .............................. 2003-001543

(51) Int. Cl.
*G06T 15/00* (2006.01)
(52) U.S. Cl. ........................ 345/427; 345/473; 345/639; 463/5; 463/32
(58) Field of Classification Search ................. 345/427, 345/473, 639, 474, 475; 463/2, 5, 49, 32
See application file for complete search history.

(56) References Cited

U.S. PATENT DOCUMENTS

| | | | | |
|---|---|---|---|---|
| 6,887,157 B2 * | 5/2005 | LeMay et al. | ................. | 463/32 |
| 7,084,888 B2 * | 8/2006 | Takahama et al. | ........... | 345/649 |
| 7,140,962 B2 * | 11/2006 | Okuda et al. | .................... | 463/2 |
| 2002/0103031 A1 | 8/2002 | Neveu et al. | .................... | 463/5 |

FOREIGN PATENT DOCUMENTS

| | | |
|---|---|---|
| JP | H07-244747 A | 9/1995 |
| JP | 2001-195608 A | 7/2001 |

OTHER PUBLICATIONS

EA Sports: "Tiger Woods PGA Tour 2002" Game Manual, 2002, pp. 1-90.

* cited by examiner

*Primary Examiner*—Phu K Nguyen
(74) *Attorney, Agent, or Firm*—Global IP Counselors, LLP (57) ABSTRACT

An image display control program for displaying a plurality of objects on a display unit from a plurality of angles is disclosed, the image display control program causing a video game device to perform as an operation reception unit which receives operations from an operator via an operation unit, a camera viewpoint movement unit that causes a camera viewpoint to move, in accordance with the operations received by the operation reception unit, with respect to a reference point that is a point on a straight line linking a first object and a second object among the plurality of objects, and a camera image display control unit that causes at least one of the images of the first and second objects to be displayed on a display unit from the camera viewpoint that was moved by means of the camera viewpoint movement unit.

11 Claims, 9 Drawing Sheets

*Fig. 9*

IMAGE DISPLAY CONTROL PROGRAM, IMAGE DISPLAY CONTROL METHOD, AND VIDEO GAME DEVICE

TECHNICAL FIELD

The present invention relates to an image display control program, an image display control method, and a video game device for displaying a plurality of objects on a display screen from a plurality of angles.

BACKGROUND ART

Video game devices that can display objects from a plurality of directions are known in the prior art. For example, in a video game device capable of executing a video game having a golf game theme, when the golf ball is on the green, it is possible to observe the golf ball and the cup from the golf ball side or the cup side and from a viewpoint in which the golf ball and the cup are aligned with each other.

However, with conventional game devices, there are limitations on the display of a plurality of objects from various directions, and thus it is difficult for a player who is operating the game to sufficiently understand the relationships between the plurality of objects. In particular, with a video game such as a golf game, when putting a golf ball in order to roll it on the green and into the cup, the distance between the golf ball and the cup must be sufficiently understood by the player, and thus the feeling of distance between the plurality of objects must be sufficiently understood by a player.

In addition, with video games having a golf game theme, there are those in which the level of putting difficulty is increased such that a player is made to consider undulations on the green when performing a put. In this type of situation, the player must sufficiently understand the undulations on the green. With a conventional video game device in which the golf ball and the cup are viewed from the golf ball side or the cup side and the green is observed only from a viewpoint in which the golf ball and the cup are viewed as if in a straight line, there are limitations in how the undulations of the green can be expressed, and how a player will understand the undulated state of the green.

SUMMARY OF THE INVENTION

An object of the present invention is to provide an image display control program, an image display control method, and a video game device that solves the aforementioned problems, and which can display a plurality of objects from a variety of directions.

According to a first aspect of the present invention, an image display control program displays a plurality of objects on a display unit from a plurality of angles, the image display control program causing a video game device to perform:

an operation reception function which receives operations from an operator via an operation unit;

a camera viewpoint movement function that causes a camera viewpoint to move, in accordance with the operations received by the operation reception function, with respect to a reference point that is a point on a straight line linking a first object and a second object among the plurality of objects; and a camera image display control function that causes at least one of the images of the first and second objects to be displayed on a display unit from the camera viewpoint that was moved by means of the camera viewpoint movement function.

The invention according to the first aspect is an image display control program for displaying a plurality of objects on a display unit from a plurality of angles. According to the first aspect, the operation reception function receives operations from an operator via an operation unit, the camera viewpoint movement function causes a camera viewpoint to move, in accordance with the operations received by the operation reception function, with respect to a reference point that is a point on a straight line linking a first object and a second object among the plurality of objects, and the camera image display control function causes at least one of the images of the first and second objects to be displayed on a display unit from the camera viewpoint that was moved by means of the camera viewpoint movement function.

In other words, one point on a straight line that links the first object and the second object is a reference point, and the camera viewpoint is moved with respect to the reference point to a position desired by an operator in accordance with the operations of the operator. Images that allows the operator to view at least one of the first and second objects will be displayed on the display unit from the camera viewpoint that was moved. Accordingly, at least one of the first and second objects can be displayed on the display unit from the angle desired by the operator.

According to a second aspect of the present invention, the operation reception function will determine the tilt direction of the operation unit, and the camera viewpoint movement function will cause the camera viewpoint to move in a circle around the reference point, and in accordance with an angle corresponding to the tilt direction determined by the operation reception function.

According to the second aspect of the present invention, the operation reception function will determine the tilt direction of the operation unit, and the camera viewpoint movement function will cause the camera viewpoint to move in a circle around the reference point, and in accordance with an angle corresponding to the tilt direction determined by the operation reception function.

In other words, the camera viewpoint is moved in a circle around the reference point, and positioned in accordance with an angle corresponding to the tilt direction determined by the operation reception function. In this situation, the first and second objects can be displayed on the display unit from an angle desired by the operator by simply tilting the operation unit in the direction desired by the operator.

According to a third aspect of the present invention, the operation reception function receives a camera viewpoint height operation from the operator that adjusts the height of the camera viewpoint; and the camera viewpoint movement function causes the camera viewpoint to move to a height based upon the camera viewpoint height operation received by the operation reception function.

According to the third aspect of the present invention, the operation reception function receives camera viewpoint height operations from the operator that adjust the height of the camera viewpoint, and the camera viewpoint movement function causes the camera viewpoint to move to a height based upon the camera viewpoint height operations received by the operation reception function.

In other words, the camera viewpoint will be moved to an angle and height that is based on the operation of the operator, and at least one of the first and second objects will be displayed at this camera viewpoint. In this situation, at least one of the first and second objects can be displayed on the display unit from the height desired by the operator.

According to a fourth aspect of the present invention, an image display control program displays a plurality of objects on a display unit from a plurality of angles, the image display control program causing a video game device to perform:

an operation reception function which receives operations from an operator via an operation unit;

a camera viewpoint movement function that causes a camera viewpoint to rotatively move, in accordance with the operations received by the operation reception function, with respect to a reference point that is a point on a straight line linking a first object and a second object among the plurality of objects, and a camera image display control function that causes at least one of the images of the first and second objects to be displayed on a display unit as seen from the camera viewpoint that was moved by means of the camera viewpoint movement function.

According to the fourth aspect of the present invention, image display control program for displaying a plurality of objects on a display unit from a plurality of angles, the operation reception function receives operations from an operator via an operation unit, the camera viewpoint movement function causes a camera viewpoint to move, in accordance with the operations received by the operation reception function, with respect to a reference point that is a point on a straight line linking a first object and a second object among the plurality of objects, and the camera image display control function causes at least one of the images of the first and second objects to be displayed on a display unit from the camera viewpoint that was moved by means of the camera viewpoint movement function.

In other words, in accordance with the operation of the operation unit by an operator, the operator can display at least one of the first and second objects on the display unit from the rotatively moved camera viewpoint, while rotating around the periphery thereof.

Note that with the image display control program disclosed in any of the first to fourth aspects, it is also possible for the camera viewpoint movement function to rotatively move the camera viewpoint around a reference point that is a point on a straight line that links a golf ball and a cup displayed on the display unit with a video game having a golf theme, and for the camera image display control function to display images of a golf ball, a cup, and the green surrounding these from the camera viewpoint moved by the camera viewpoint movement function. In this way, in a video game having a golf theme, the operator can display the golf ball and cup on the display unit from any angle when the operator is to perform a put. Because of this, the operator can sufficiently understand the relationships between the golf ball and the cup. In this way, an operator can consider the relationships between the golf ball and the cup via the operation unit when putting, a video game can be designed so that the operator can place the golf ball in the cup, and thus a video game can be provided that is highly playable.

In addition, the invention described above may be configured so that the camera image display control function displays the green so that the height thereof is distinguished with color. In this way, an operator can display, at any angle, a green that is color-coded in accordance with the height of the golf ball, cup, and surrounding periphery. Here, an operator can not only see the golf ball and the cup from the golf ball side or the cup side, and view the green at a view angle that allows the golf ball and cup to be seen in a straight line, but can also view the green diagonally and from other view angles. Thus, by color coding a green in accordance with the height that can be seen by the operator from a variety of view angles, the operator can understand the undulations of the green in greater detail. In this way, an operator can consider the relationships between the golf ball and the cup via the operation unit when putting, a video game can be designed so that the operator can place the golf ball in the cup, and thus a video game can be provided that is highly playable.

According to a fifth aspect of the present invention, an image display control method displays a plurality of objects on a display unit of a video game device from a plurality of angles, comprising the steps of:

receiving an operation from an operator via an operation unit of a video game device;

causing a camera viewpoint to move, in accordance with the operations received in the operation reception step, with respect to a reference point that is a point on a straight line linking a first object and a second object among the plurality of objects; and displaying on the display unit at least one of the images of the first and second objects from the camera viewpoint moved in the camera viewpoint movement step.

According to the fifth aspect of the present invention, an image display control method displays a plurality of objects on a display unit from a plurality of angles, and in the operation reception step, a video game device receives operations from an operator via an operation unit, in the camera viewpoint movement step, the video game device causes a camera viewpoint to move, in accordance with the operations received by the operation reception step, with respect to a reference point that is a point on a straight line linking a first object and a second object among the plurality of objects, and in the camera image display control step, the video game device causes at least one of the images of the first and second objects to be displayed on the display unit from the camera viewpoint that was moved by means of the camera viewpoint movement step.

In other words, the camera viewpoint is moved, in accordance with the operations of an operator received in the operation reception step, with respect to a reference point that is one point on a straight line that links the first object and the second object, and images that show the first and second object are displayed on a screen from the camera viewpoint that was moved. In this situation, the first and second objects can be displayed on the display unit from the angle desired by the operator.

According to a sixth aspect of the present invention, an image display control device which displays a plurality of objects on a display unit from a plurality of angles, comprising:

an operation reception means which receives an operation from an operator via an operation unit;

a camera viewpoint movement means that causes a camera viewpoint to move, in accordance with the operations received by the operation reception means, with respect to a reference point that is a point on a straight line linking a first object and a second object among the plurality of objects; and a camera image display control means that causes at least one of the images of the first and second objects to be displayed on a display unit from the camera viewpoint that was moved by means of the camera viewpoint movement means.

According to the sixth aspect of the present invention, an image display control device displays a plurality of objects on a display unit from a plurality of angles, and comprises an operation reception means which receives operations from an operator via an operation unit, a camera viewpoint movement means that causes a camera viewpoint to move, in accordance with the operations received by the operation reception means, with respect to a reference point that is a point on a straight line linking a first object and a second object among the plurality of objects, and a camera image display control means that causes at least one of the images of the first and second objects to be displayed on a display unit from the camera viewpoint that was moved by means of the camera viewpoint movement means.

In other words, the camera viewpoint is moved, in accordance with the received operations of an operator, with respect to a reference point that is one point on a straight line that links the first object and the second object, and images that show the first and second object are displayed on the display unit from the moved camera viewpoint. In this situation, the first and second objects can be displayed on the display unit from the angle desired by the operator.

PREFERED EMBODIMENTS OF THE INVENTION

A video game device according to one embodiment of the present invention will be described below with reference to the figures.

Figure 1:
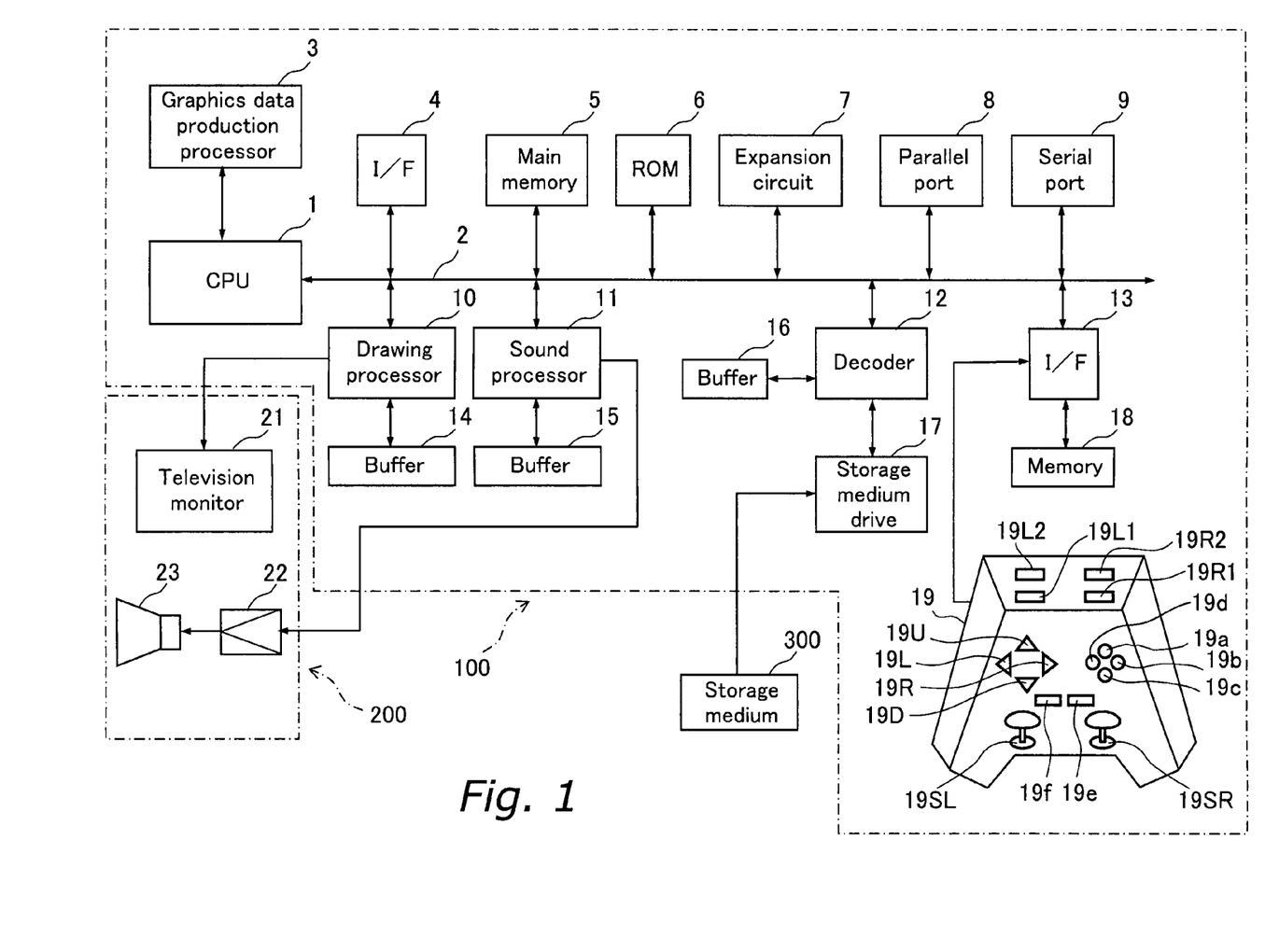
FIG. 1 is a block diagram showing the configuration of a video game device according to a first embodiment of the present invention.

FIG. 1 is a block diagram showing the configuration of a video game device according to one embodiment of the present invention. A video game device for home use, which includes a video game machine for home use connected to a television for home use, will be used below as an example of the video game device of the present invention. However, it should be noted that the present invention is not limited to this example, and can be applied to a commercial video game device that is unitarily formed with a monitor, a personal computer that functions as a video game device by executing a video game program, or the like.

The video game device shown in FIG. 1 includes a game machine for home use 100 and a television for home use 200. The game machine for home use 100 includes a computer readable storage medium 300 on which is stored a video game program and game data. The video game program and the game data are appropriately read out by the game machine for home use 100 to thereby execute a game.

The game machine for home use 100 includes a CPU (central processing unit) 1, a bus line 2, a graphics data production processor 3, an interface circuit (I/F) 4, a main memory 5, a ROM (read only memory) 6, an expansion circuit 7, a parallel port 8, a serial port 9, a drawing processor 10, a sound processor 11, a decoder 12, an interface circuit 13, buffers 14-16, a storage medium drive 17, a memory 18, and a controller 19. The television for home use 200 includes a television monitor 21, an amplifier 22, and a speaker 23.

The CPU 1 is connected to the bus line 2 and the graphics data production processor 3. The bus line 2 includes an address bus, a data bus, and a control bus, and the CPU 1, the interface circuit 4, the main memory 5, the ROM 6, the expansion circuit 7, the parallel port 8, the serial port 9, the drawing processor 10, the sound processor 11, the decoder 12, and the interface circuit 13 are mutually connected to the bus line 2.

The drawing processor 10 is connected to the buffer 14. The sound processor 11 is connected to the buffer 15 and the amplifier 22. The decoder 12 is connected to the buffer 16 and the storage medium drive 17. The interface circuit 13 is connected to the memory 18 and the controller 19.

The television monitor 21 of the television for home use 200 is connected to the drawing processor 10. The speaker 23 is connected to the amplifier 22. Note that with a commercial video game device, the television monitor 21, the amplifier 22, and the speaker 23 may be accommodated in one housing together with each block that forms the game machine for home use 100.

In addition, in the event that a personal computer, a workstation, or the like forms the core of the video game device, the television monitor 21 and the like will correspond to a computer display. Furthermore, the expansion circuit 7, the drawing processor 10, the sound processor 11, and the like respectively correspond to a portion of the program data recorded on the storage medium 300, or hardware on an expansion board that is mounted in an expansion-slot-of the computer. In addition, the interface circuit 4,-the-parallel port 8, the serial port 9, and the interface circuit 13 correspond to hardware on an expansion board that is mounted in an expansion slot of the computer. Furthermore, the buffers 14-16 respectively correspond to each storage area of the main memory 5 or an expansion memory.

Next, each essential component shown in FIG. 1 will be described. The graphics data production processor 3 acts as a co-processor of the CPU 1. In other words, the graphics data production processor 3 will perform coordinate transformations and light source calculations, e.g., the computation of fixed point format lines and vectors, by means of parallel processing.

The primary processes that the graphics data production processor 3 performs are based upon coordinate data, distance data, rotational movement data, and the like for each vertex in the two-dimensional or virtual three-dimensional space of the image data supplied from the CPU 1. These processes include one which requests address data for the images to be processed in a predetermined display area and which then returns the address data to the CPU 1, one that calculates the brightness of images in accordance with the distance from an imaginary light source, as well as other similar processes.

The interface circuit 4 is used as an interface with peripheral devices, e.g., a pointing device or the like, such as a mouse device, a trackball, or the like. The main memory 5 is formed by RAM (random access memory) or the like. Program data, such as the operating system for the video game device, is stored in the ROM 6. This program corresponds to a BIOS (basic input output system) for a personal computer.

The expansion circuit 7 performs an expansion process on compressed images that have been compressed by means of intracoding that complies with the MPEG (Moving Picture Experts Group) standard for moving images or the JPEG (Joint Photographic Experts Group) standard for still images. The expansion process includes a decoding process (decoding data encoded by means of VLC (Variable Length Code)), a reverse quantization process, an IDCT (Inverse Discrete Cosine Transform) process, an intraimage decompression process, and the like.

The drawing processor 10 will perform a drawing process for the buffer 14 based upon a drawing command issued by the CPU 1 every predetermined time period T (e.g., T=1/60 second for one frame).

The buffer 14 is formed with RAM, for example, and is divided into a display area (frame buffer) and a non-display area. The display area includes a deployment area for the data that will be displayed on the display screen of the television monitor 21. The non-display area includes a storage area that stores data that defines skeletons, model data that defines polygons, animation data that causes models to move, pattern data that indicates the details of each animation, texture data, color palette data, and the like.

Here, the texture data is two-dimensional image data. The color palette data serves to indicate the color of the texture data and the like. The CPU 1 reads this data from the storage medium 300 either once or a plurality of times in accordance with the progress of the game, and stores this data in advance in the non-display area of the buffer 14.

In addition, the aforementioned drawing command may be one which uses polygons to draw three-dimensional images, or one which draws standard two-dimensional images. Here, the polygons are polygonal two-dimensional virtual figures, e.g., triangles and squares may be used.

The drawing command that uses polygons to draw three-dimensional images is respectively performed for polygon vertex address data that indicates the storage location of polygon vertex coordinate data in the display area of the buffer 14, texture address data that indicates the storage location of textures in the buffer 14 that are applied to the polygons, color palette address data that indicates the storage location of the color palette in the buffer 14 that indicates the colors of the textures, and brightness data that indicates the brightness of the textures.

The graphics data production processor 3 converts the polygon vertex address data in the display area to two-dimensional polygon vertex coordinate data by converting the coordinates of the polygon vertex coordinate data from the CPU 1 in a virtual three-dimensional space based upon the distance data and the rotational movement data. The brightness data is determined by means of the graphics data production processor 3, based upon the distance from the position indicated by the polygon vertex coordinate data after coordinate conversion to a virtual light source.

The polygon vertex address data indicates an address in the display area of the buffer 14. The drawing processor 10 writes texture data to the display area in the buffer 14 that is indicated by three polygon vertex address data.

Objects such as characters and the like in a game space are formed with a plurality of polygons. The CPU 1 associates the coordinate data for each polygon in the virtual three-dimensional space with vector data for the corresponding skeleton and stores this in the buffer 14. Then, when characters and the like are to be moved on the display screen of the television monitor 21 by operation of a controller 19 (described below), the following processes will be performed when representing the movement of the characters, changing the point of view from which the characters are seen, etc.

In other words, the CPU 1 will provide to the graphics data production processor 3 three-dimensional coordinate data for the vertices of each polygon that is held in the non-display area of the buffer 14, and distance data and rotational movement data for each polygon that is requested from the skeleton coordinates and the rotational movement data thereof.

The graphics data production processor 3 sequentially requests the three-dimensional coordinate data for each polygon after the movement and rotation thereof, based upon the three-dimensional coordinate data for the vertices of each polygon and the distance data and rotational movement data of each polygon.

From amongst the three-dimensional coordinate data for each polygon requested in this manner, the coordinate data in the horizontal and vertical directions is stored in the drawing processor 10 as address data for the display area of the buffer 14, e.g., as polygon vertex address data.

The drawing processor 10 writes texture data indicated by pre-assigned texture address data to the display area of the buffer 14 indicated by three polygon vertex address data. In this way, objects formed by a plurality of polygons to which textures have been applied will be displayed on the display screen of the television monitor 21.

The drawing commands that serve to draw standard two-dimensional images are performed for vertex address data, texture address data, color palette address data that indicates the storage location of the color palette data in the buffer 14 that indicates the colors of the texture data, and brightness data that indicates the brightness of the textures. The graphics data production processor 3 obtains the vertex address data by converting the vertex coordinate data in the two-dimensional plane, based upon the distance data and rotational movement data from the CPU 1.

The sound processor 11 stores ADPCM (Adaptive Differential Pulse Code Modulation) data read out from the storage medium 300 in the buffer 15, and the ADPCM data stored in the buffer 15 is a sound source.

In addition, the sound processor 11 will read out the ADPCM data from the buffer 15 that is based upon, for example, a 44.1 kHz clock signal. The sound processor 11 processes the ADPCM data for pitch conversion, added noise, envelop settings, level settings, added reverb, and the like.

When the sound data read out from the storage medium 300 is PCM (Pulse Code Modulation) data such as CD-DA (Compact Disk-Digital Audio) and the like, the sound processor 11 will convert the sound data to ADPCM data. In addition, processing of the PCM data will be directly performed in the main memory 5. The PCM data processed in the main memory 5 is supplied to the sound processor 11 and converted to ADPCM data. Then, each of the aforementioned processes will be performed, and the sound will be output from the speaker 23.

The storage medium drive 17 used in the present invention may be, for example, a DVD-ROM drive, a CD-ROM drive, a hard disk drive, an optical disk drive, a flexible disk drive, a silicon disk drive, a cassette media reading device, and the like. The storage medium 300 used in the present invention may be a DVD-ROM, CD-ROM, hard disk, optical disk, flexible disk, semiconductor memory, and the like.

The storage medium drive 17 reads out image data, sound data, and program data from the storage medium 300, and supplies this data to the decoder 12. The decoder 12 performs an error correction process for the data obtained from the storage medium drive 17 by means of ECC (Error Correction Code), and the data processed for error correction will then be supplied to the main memory 5 or the sound processor 11.

The memory 18 used in the present invention may, for example, be a card type memory. Among other reasons, a card type memory is used to hold various game parameters, which allows a game to be maintained in the state it was in when play was suspended.

The controller 19 is a control device that a player uses to input various control commands, and control signals will be transmitted to the CPU 1 in response to the operation of the controller 19 by the player. The controller 19 is provided with a first button 19a, a second button 19b, a third button 19c, a fourth button 19d, an up key 19U, a down key 19D, a left key 19L, a right key 19R, an L1 button 19L1, an L2 button 19L2, an R1 button 19R1, and R2 button 19R2, a start button 19e, a select button 19f, a left stick 19SL, and a right stick 19SR.

The up key 19U, down key 19D, left key 19L, and right key 19R are used, for example, to provide commands to the CPU 1 that will move a character or cursor up, down, left, and right on the screen of the television monitor 21.

The start button 19e is used to, among other things, direct the CPU 1 to load a game program from the storage medium 300. The select button 19f is used to, among other things, direct the CPU 1 to make various selections relating to the game program loaded into the main memory 5 from the storage medium 300.

Other than the left stick 19SL and the right stick 19SR, each button and key of the controller 19 includes an on/off switch which will be turned on when a pressing force is applied to a button or key in a neutral position, and turned off when a pressing force is released and the button or key returns to the neutral position.

The left stick 19SL and the right stick 19SR are stick type controllers that are each substantially the same as a so-called joystick. Each stick type controller has an upright stick, and a predetermined position of the stick can be tilted as a fulcrum through 360 degrees, including forward, backward, left, and right. The left stick 19SL and the right stick 19SL will, in response to the tilt direction and tilt angle of the sticks, transmit x coordinate values in the left to right direction and y coordinate values in the forward and backward direction, based upon the upright position as the origin, to the CPU 1 as control signals via the interface circuit 13.

Note that the first button 19a, second button 19b, third button 19c, fourth button 19d, L1 button 19L1, L2 button 19L2, R1 button 19R1, and R2 button 19R2 are used in various functions in accordance with the game program loaded from the storage medium 300.

Next, an overview of the operation of the video game will be described. When the storage medium 300 is loaded into the storage medium drive 17, and the power source switch (not shown in the figures) is turned on and power is supplied to the video game device, the CPU 1 will command the storage medium drive 17 to read a game program from the storage medium 300 based on the operating system stored in ROM 6. Thus, the storage medium drive 17 will read image data, sound data, and program data from the storage medium drive 300. The image data, sound data, and program data read out is supplied to the decoder 12, and an error correction process will be performed on each data by the decoder 12.

The image data on which the error correction process was performed by the decoder 12 is then supplied to the expansion circuit 7 via the bus line 2. The image data on which the aforementioned expansion process was performed by means of the expansion circuit 7 is then supplied to the drawing processor 10, and is written to the non-display area of the buffer 14 by the drawing processor 10. The sound data on which the error correction process was performed by the decoder 12 is written to the buffer 15 via the main memory 5 or the sound processor 11. The program data on which the error correction process was performed by the decoder 12 is written to the main memory 5.

Then, the CPU 1 executes the video game based upon the game program stored in the main memory 5 and the commands transmitted by a player via the controller 19. In other words, based upon the commands transmitted by a player via the controller 19, the CPU 1 performs the appropriate control of the image process, the sound process, the internal process, and the like.

Image process control includes, for example, calculation of the coordinates of each skeleton from the pattern data corresponding to the animation selected for a character or calculation of the polygon vertex coordinate data, supplying data such as the three-dimensional coordinate data and point-of-view data to the graphics data production processor 3, issuing drawing commands that include data such as address data and brightness data in the display area of the buffer 14 that was requested by the graphics data production processor 3, and the like.

Sound process control includes, for example, issuing sound output commands to the sound processor 11, and selecting level, reverb, and the like. Internal process control includes, for example, the performance of calculations in response to the operation of the controller 19.

Next, the video game to be executed based on the game program stored in the storage medium 300 will be described. The video game of the present embodiment is based upon a golf game. In the golf game of the present embodiment, when a golf green is the location of the game, and a golf ball is to be struck and placed into a cup by a player who is using the controller 19 to control a golf club, the rule is that one game will be completed.

The area around the cup of the green has undulations, and if a player strikes a golf ball without taking the relationships between the golf ball and cup into consideration as well as the undulations of the green, the player will not be able to place the golf ball in the cup. Because of this, in the present embodiment, a green having an undulations will be displayed on the television monitor 21 from various angles, and the player will be able to understand both the relationships between the golf ball and the cup and the undulations of the green.

Figure 2:
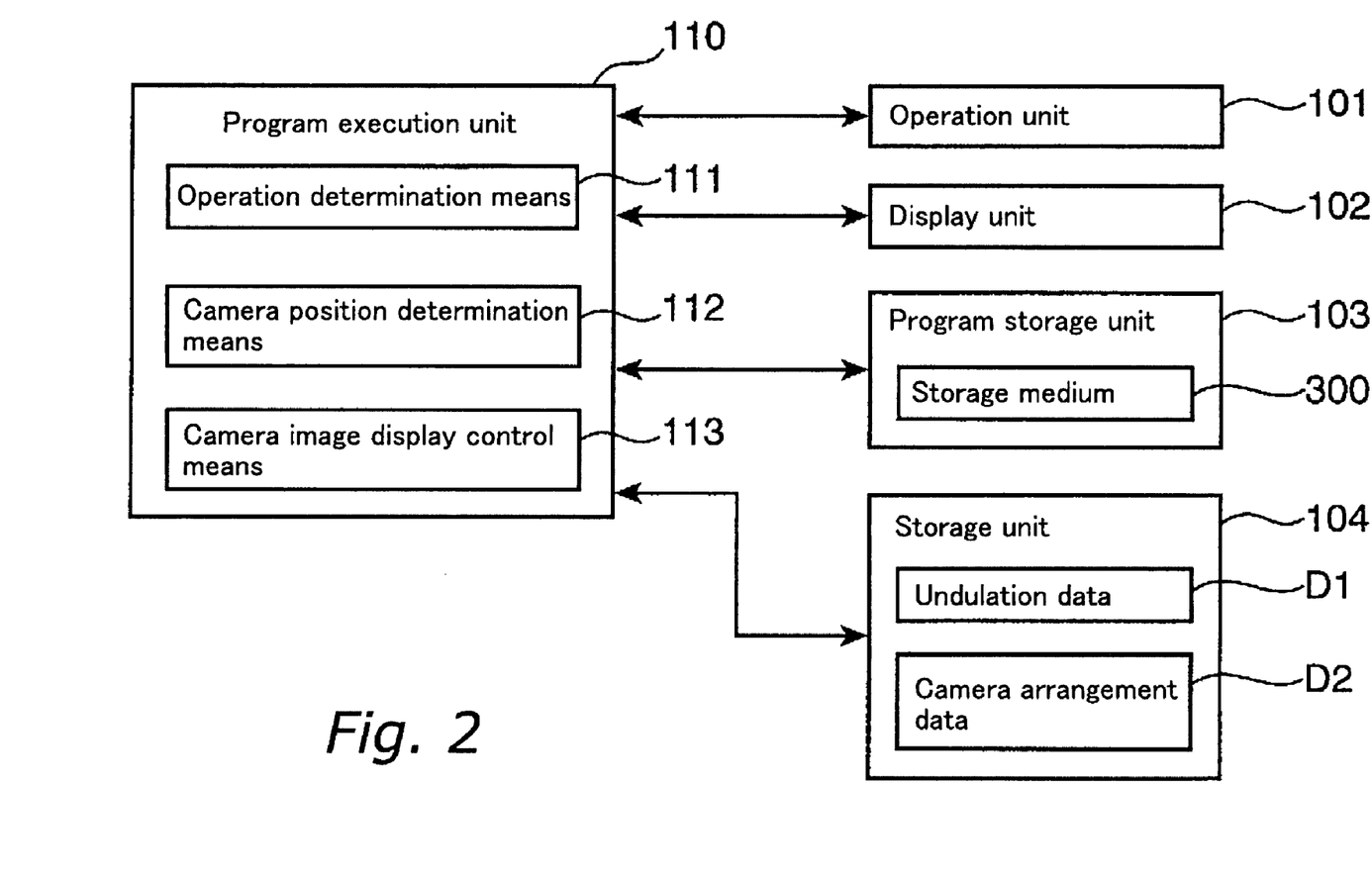
FIG. 2 is a block diagram showing the primary functions of the video game device according to the first embodiment of the present invention.

FIG. 2 is a block diagram showing the primary functions of the video game device according to an embodiment of the present invention. The video game device includes an operation unit 101, a display unit 102, a program storage unit 103, a storage unit 104, and a program execution unit 110.

The operation unit 101 includes the controller 19 that receives control commands from a player. Control commands are commands which cause predetermined processes to be executed in the video game device by means of a player operating the operation unit 101. These control commands not only include a golf club control command that serves to operate the golf club, but also include a camera viewpoint display command, a camera viewpoint display cancellation command, a camera arrangement command, and the like.

The camera viewpoint display command will request that the standard view mode, which displays the fairway from a normal view of a golfer, be switched to the camera viewpoint mode, which displays the position of the cup and the golf ball on the green from a camera viewpoint. Here, the camera viewpoint is a viewpoint that is established in the vicinity of the cup and golf ball on the green. The camera viewpoint allows a player to view the cup and the golf ball located on the green, and understand the relationships between the cup and the golf ball. The camera viewpoint display cancellation command will request that the camera viewpoint mode be cancelled, and switch to the standard view mode.

The camera arrangement command allows a player to designate the arrangement position of the camera viewpoint when the golf ball and cup on the green are displayed from the camera viewpoint. The camera arrangement command is input by a player operating an angle designation stick that is implemented by the right stick 19SR (or the like) and height designation buttons that are implemented by the buttons 19L1 and 19R1 (or the like). For example, in the event that a player has tilted the angle designation stick, a camera arrangement command will be input that requests the camera viewpoint to move to a position corresponding to the direction in which the angle designation stick was tilted. In addition, in the event that a player has pushed height designation buttons that include an up designation button and a down designation button, a camera arrangement command will be input that will move the position of the camera viewpoint up or down in proportion to the length of time the height designation buttons were pushed.

The display unit 102 displays game images, and is formed by the television monitor 21. The display unit 102 can display the game images in the aforementioned standard view mode or the camera viewpoint mode. For example, if the camera viewpoint mode is selected when the golf ball is positioned on the green, the display unit 102 will display the golf ball, cup, and surrounding green from the camera viewpoint desired by a player in response to a camera arrangement command.

The program storage unit 103 includes the computer readable storage medium 300. The storage medium 300 is mounted in the storage medium drive 16 or the like. A video game program that includes an image display control program is stored on the storage medium 300. Note that when the video game program is read out from the storage medium 300, and the program is stored in the main memory 5, the main memory 5 will function as the program storage unit 103.

The storage unit 104 is implemented by the main memory 5 and the buffers 14 to 16 shown in FIG. 1, and includes undulation data D1 read out by the storage medium 300, and camera arrangement data D2. The undulation data D1 is data which will render undulations on the green. Based on the undulation data D1, a green having undulations will be displayed on the display unit 102.

Here, the green will be defined and displayed by means of gridlines. The gridlines are red at the highest portion of the green and blue at the lowest portion of the green, and are displayed with gradations such that they become warmer in color as the height of the green increases and cooler in color as the height of the green decreases. In addition, a wave 203 is displayed on the green (see FIG. 7), and spreads out from the high point to the low point of the green. Data that indicates the colors of the gridlines and the movement of the wave 203 is includes in the undulation data D1. The data that indicates the color of the gridlines and the movement of the waves contained in the undulation data D1 is fixed data that is not rewritten by execution of the video game, and is read out from the storage medium 300. Note that the portion of the green in which the wave is displayed and the portion of the green in which the wave is not displayed are preferably displayed so that a player can recognize both. For example, if the wave is displayed so that it is translucent, even if a wave is displayed on the green, a player can discern the colors of the gridlines on the green on which the wave is displayed, and can thereby understand the height of the green by means of the colors of the gridlines.

The camera arrangement data D2 is stored in the storage unit 104 when the camera viewpoint mode is set. For example, the camera arrangement data D2 includes data indicating the camera viewpoint coordinates, and is stored in the storage unit 104. Based on the camera arrangement command input, the coordinates of the camera viewpoint will be changed in response to vertical movement of the camera viewpoint, and the rotational movement of the camera viewpoint around a rotation reference point P that is a point on a straight line connecting the golf ball and the cup on the green. A display will be provided from the camera viewpoint based on the camera arrangement data D2. Note that the coordinates of the rotational reference point P are included in the camera arrangement data D2.

The program execution unit 110 is implemented by means of the CPU 1, the drawing processor 10, or the like, and includes an operation determination means 111, a camera position setting means 112, and a camera image display control means 113. The operation determination means 111 will receive the camera viewpoint display command and camera viewpoint display cancellation command from a player via the operation unit 101. Then, in accordance with the camera viewpoint display command or the camera viewpoint display cancellation command, a display request signal that requests image display from the camera viewpoint or the cancellation of the image display will be transmitted to the camera position setting means 112 (described below).

In addition, the operation determination means 111 functions as an operation receiving means, and when the camera viewpoint is to be displayed, will receive a camera arrangement command from a player via the operation unit 101, and will determine the arrangement position of the camera viewpoint requested by a player based upon the camera arrangement command. Then, the position of the camera viewpoint requested by the player will be transmitted as a camera arrangement position signal to the camera position setting means 112 (described below). Here, the operation determination means 111 will determine the direction in which the player has tilted the angle designation stick, the length of time the height designation buttons were pushed, and the like by means of the camera arrangement command, and will transmit a camera arrangement position signal based upon this direction, length of time, and the like.

The camera position setting means 112 will function as a camera viewpoint operation means, will receive the display request signal and will set the display of the camera viewpoint and the cancellation of this display in accordance with the received display request signal. In addition, when the camera arrangement position signal is received in the camera viewpoint mode, the camera position setting means 112 will set the position of the camera viewpoint based upon that signal, and will write the position of the set camera viewpoint as camera arrangement data D2 in the storage unit 104 implemented by the buffer 14 and the like shown in FIG. 1.

Here, when the camera position setting means 112 receives the camera arrangement position signal, the camera position setting means 112 will, among other things, set the camera viewpoint in a position corresponding to the direction in which the player has tilted the angle designation stick, and set the camera viewpoint in a position corresponding to a height that is proportional to the length of time at which the player has pushed the height designation buttons. The method of setting the camera arrangement position will be described in detail below.

In the event that the display of the camera viewpoint is set by means of the camera position setting means 112, the camera image display control means 113 will display the green on the display unit 102 from the camera viewpoint arrangement position based on the camera arrangement data D2. On the other hand, in the event that the display of the camera viewpoint is cancelled by means of the camera position setting means 112, the camera image display control means 113 will display the green on the display unit 102 from the standard view.

Figure 3:
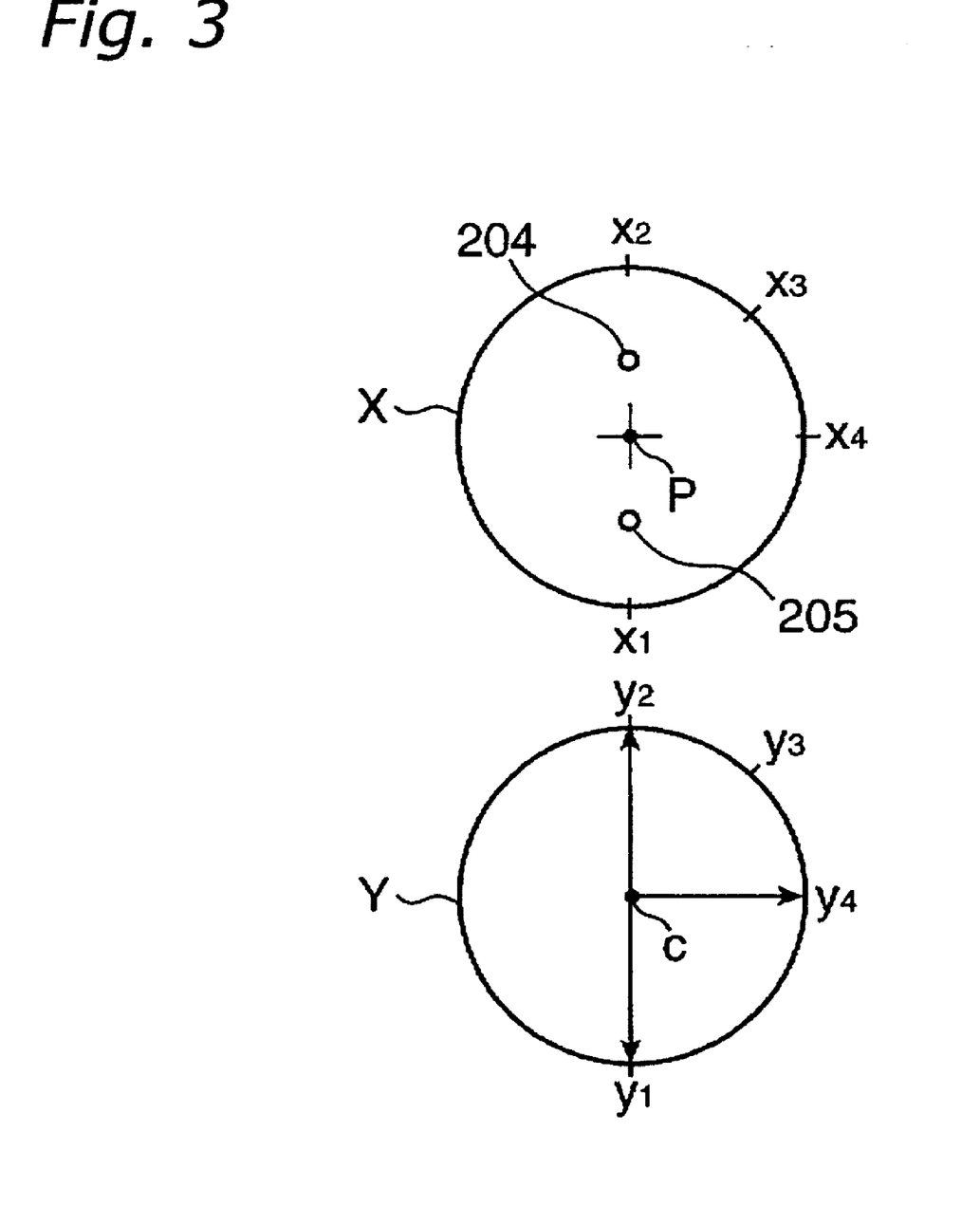
FIG. 3 describes the positional relationship between the operation of an operation unit by a user and the camera viewpoint.
Figure 4:
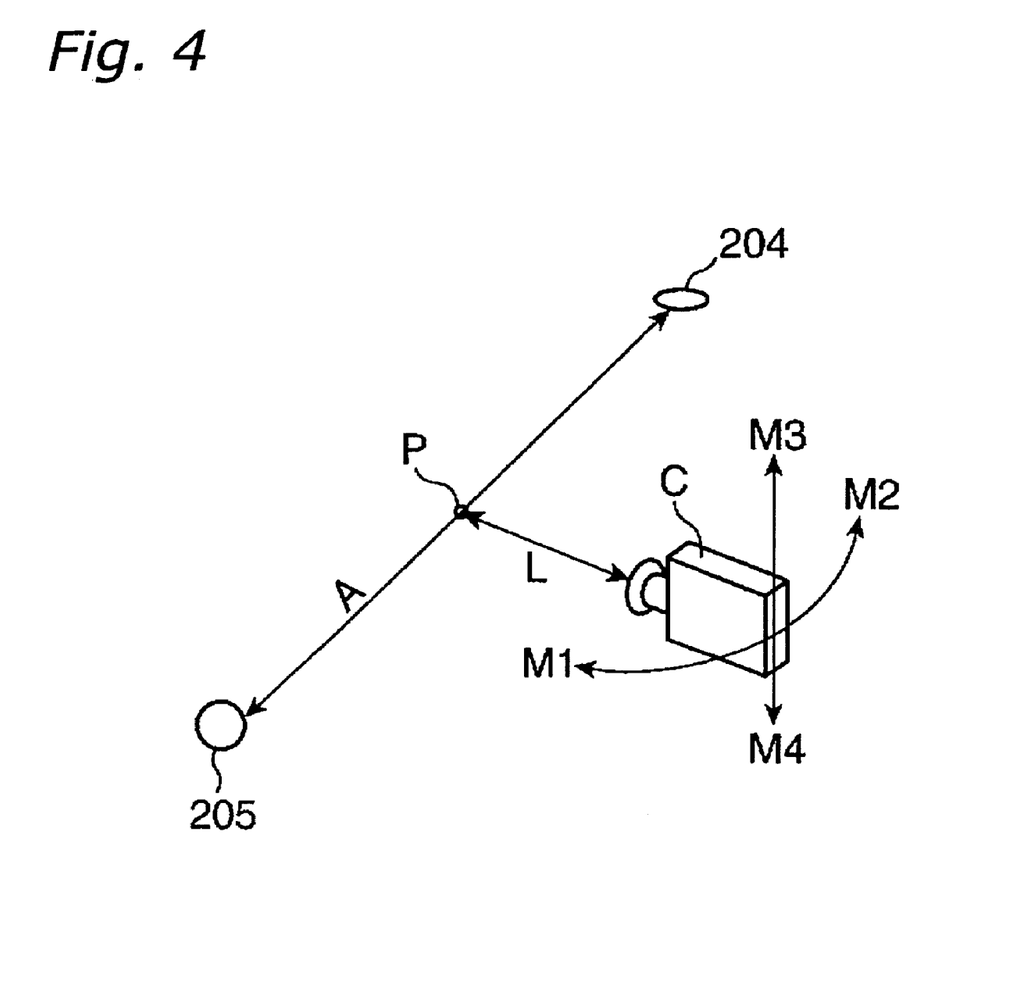
FIG. 4 describes the distances between the cup, the golf ball, and the camera viewpoint.

FIGS. 3 and 4 will be used below to describe the details of the method in which the camera position setting means 112 sets the arrangement position of the camera viewpoint based upon the camera arrangement position signal. FIG. 3 serves to describe the positional relationship between the operation of the operation unit 101 by a player and the camera viewpoint, and FIG. 4 serves to describe the distances between the cup, the golf ball, and the camera viewpoint.

In FIG. 3, the mid-point of a straight line that links the golf ball 205 and the cup 204 is set as the rotation reference point P. Here, the rotation reference point P is the mid-point obtained from the three-dimensional coordinates of the golf ball 205 and the three-dimensional coordinates of the cup 204. The position at which the camera viewpoint C can be rotatively moved around the rotation reference point P in a predetermined initial height position is the rotatable position X. Here, the predetermined initial height is the height up to which the position of the camera viewpoint can be moved in the vertical direction by the height designation buttons. The predetermined initial height is preset to be non-variable. In addition, the direction in which the angle designation stick can be tilted from a central portion c at which the angle designation stick is erect is the tilt direction Y.

The angle designation stick can be tilted in a 360 degree range around the central portion c at which the angle designation stick is erect. In the region on the right side of FIG. 3, the tilt direction of the angle designation stick is zero degrees to 180 degrees from a tilt direction y1 to a tilt direction y2, with the tilt direction y1 being zero degrees. In the region on the left side of FIG. 3, it is a direction of zero degrees to −180 degrees from the tilt direction y1 to the tilt direction y2. Here, even if the angle designation stick is in a state in which it is tilted to the predetermined tilt direction Y, the angle designation stick can be rotated 360 degrees in a circular direction around the central portion c.

The tilt direction Y and the rotatable position X are associated with each other, and when the angle designation stick is tilted in the direction of the arrow to the tilt direction y1, the position of the camera viewpoint C is the position x1, when tilted in the direction of the arrow to the tilt direction y2, the position of the camera viewpoint C is the position x2, when tilted in the direction of the arrow to the tilt direction y3, the position of the camera viewpoint C is the position x3, and when tilted in the direction of the arrow to the tilt direction y4, the position of the camera viewpoint C is the position x4. Note that the arrangement position of the camera viewpoint C when the angle designation stick is not operated, and the arrangement position of the camera viewpoint C immediately after switching to the camera viewpoint mode, will be the position x1 on the outside of the golf ball 205 on the straight line linking the golf ball 205 and the cup 204.

In FIG. 4, the camera viewpoint is positioned at position x4, based upon a camera arrangement position signal provided when the angle designation stick is tilted to the tilt direction y4 (90 degrees). The distance A is the straight line distance that links the golf ball 205 and the cup 204. The distance L is the straight line distance from the rotation reference point P to the camera viewpoint C in the predetermined initial height position. The distance L is set in accordance with the distance A. When the distance A is 10 meters or greater, the distance L will be set to be equal to the distance A. When the distance A is 10 meters or less, the distance between the golf ball 205 and the cup 204 and the camera viewpoint C will be too close, and the golf ball 205 and the cup 204 will be difficult to see, and thus the distance L will be set to 10 meters.

In FIG. 4, when the tilt angle of the angle designation stick that provides the camera arrangement position signal is changed from zero degrees to 90 degrees or from zero degrees to −90 degrees, the position coordinates of the camera viewpoint C will move in a circle which is at the predetermined initial height and is separated from the rotation reference point P by only the distance L, and will be changed to the position coordinates corresponding to the tilt direction indicated by the camera arrangement position signal. The camera viewpoint at this time will rotatively move in the left direction M1 of FIG. 4, while displaying the golf ball 205, the cup 204, and the surrounding images on the display unit 102.

When the tilt angle of the angle designation stick that provides the camera arrangement position signal is changed from 90 degrees to 180 degrees or from −90 degrees to −180 degrees, the position coordinates of the camera viewpoint C will move in a circle which is at the predetermined initial height and is separated from the rotation reference point P by only the distance L, and will be changed to the position coordinates corresponding to the tilt direction indicated by the camera arrangement position signal. The camera viewpoint at this time will rotatively move in the right direction M2 of FIG. 4, while displaying the golf ball 205, the cup 204, and the surrounding images on the display unit 102.

Here, if the up designation button is pushed, the position of the camera viewpoint C will move in an upward direction M3 toward a predetermined uppermost height limit, in proportion to the length of time that the up designation button that provides a camera arrangement position signal was pushed. At this time, the golf ball 205 and the cup 20 will be displayed from a raised camera viewpoint C on the display unit 102. On the other hand, if the down designation button is pushed, the position of the camera viewpoint C will move in an downward direction M4 toward a predetermined lowermost height limit, in proportion to the length of time that the down designation button that provides a camera arrangement position signal was pushed. At this time, the golf ball 205 and the cup 204 will be displayed from a lowered camera viewpoint C on the display unit 102. Note that the camera viewpoint C can be moved in the left and right directions M1 and M2 after being raised or lowered.

Figure 5:
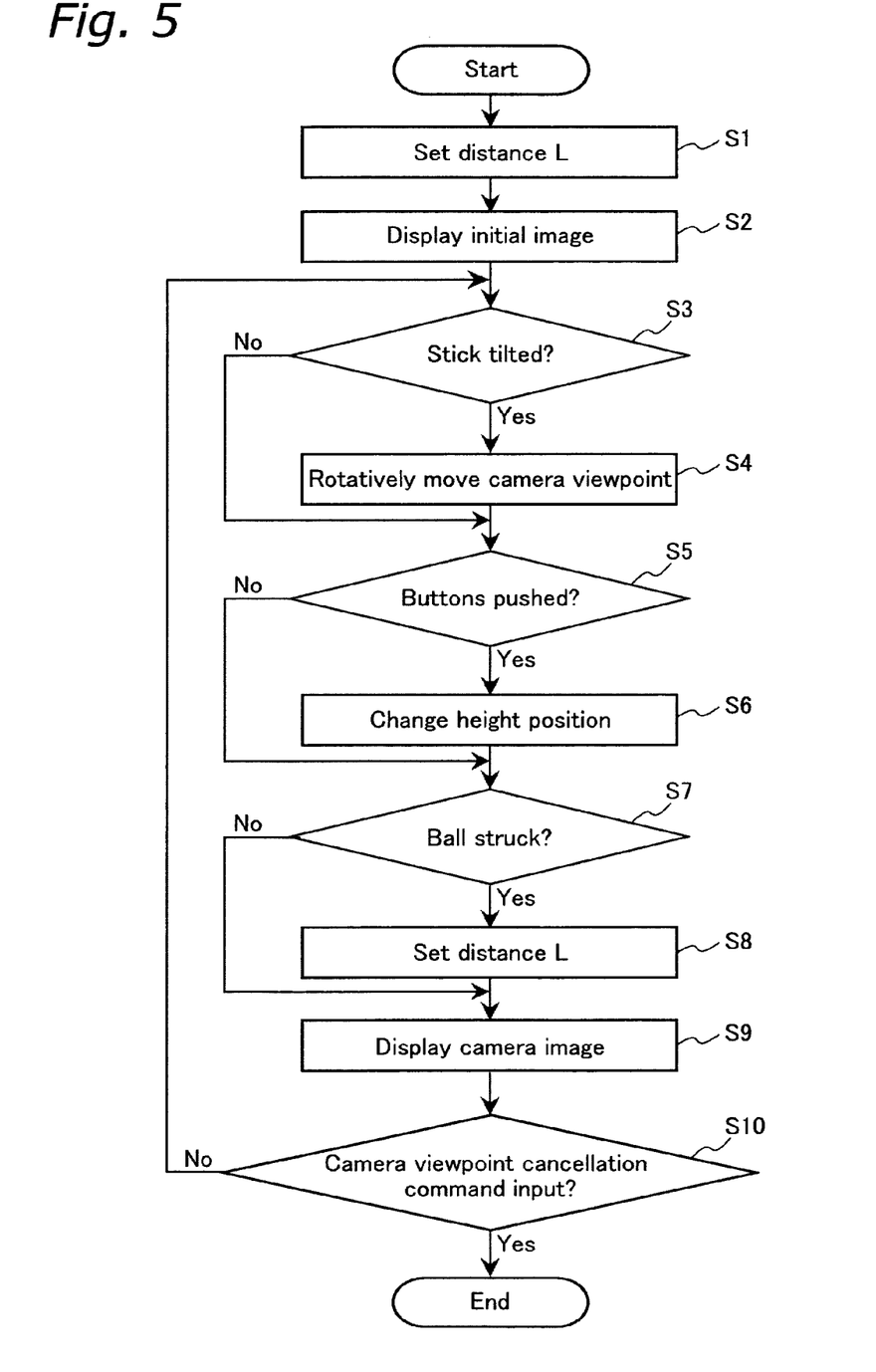
FIG. 5 is a flowchart showing one example of an image display control process performed by the video game device shown in FIG. 2.

FIG. 5 will be used below to describe the image display control process, which is performed when the aforementioned video game device executes the image display control program. FIG. 5 is a flowchart showing one example of an image display control process performed by the video game device shown in FIG. 2. The image display control process is executed when a camera viewpoint display command is received by the operation determination means 111 via the operation unit 101.

When the operation determination means 111 receives a camera viewpoint display command, the operation determination means 111 will transmit a display request signal to the camera position setting means 112. When the camera position setting means 112 has transmitted the display request signal, the camera position setting means 112 will set the distance L (S1). More specifically, the camera position setting means 112 will determine whether or not the distance A is longer than 10 meters. Then, if the distance A is longer than 10 meters, the distance L is set to be equal to the distance A, and if the distance A is shorter than 10 meters, the distance L is set to 10 meters.

Next, the camera position setting means 112 will seek the mid-point between the golf ball and the cup as the rotation reference point P on the straight line that links the golf ball and the cup, and at the predetermined initial height, will set the position of the predetermined initial direction of the circle that is separated from the rotation reference point P by only the distance L to be the initial arrangement position of the camera viewpoint. The initial direction is the direction on the golf ball 205 side on the straight line linking the golf ball 205 and the cup 204. In other words, the initial position is the x1 position shown in FIG. 3. Note that the camera position setting means 112 stores the position coordinates of the initial arrangement position of the camera viewpoint and the rotation reference point P in the storage unit 104 as camera arrangement data D2.

Figure 6:
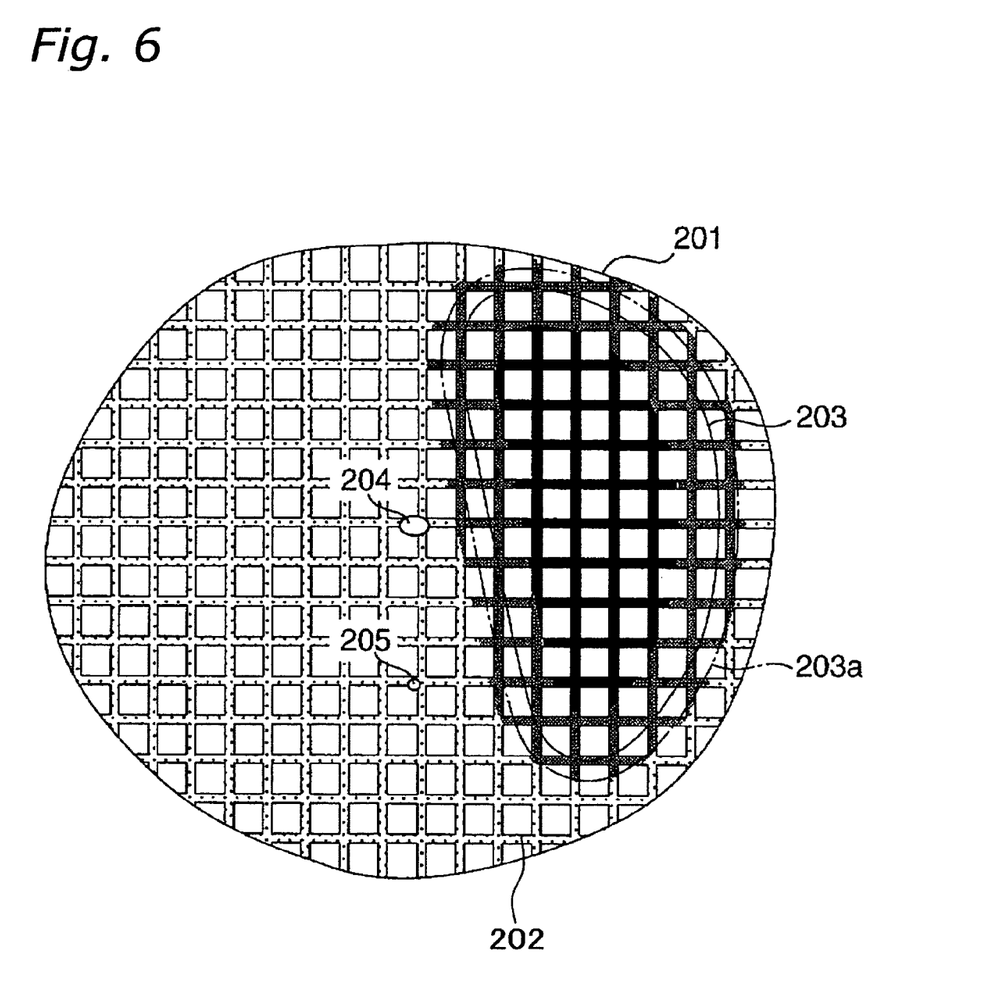
FIG. 6 is a schematic view of one example of a green that will be displayed on a display unit of the present embodiment.

The camera image display control means 113 will, based upon the camera arrangement data D2, display the golf ball, cup, and green on the display unit 102 as an initial image, and as seen from the camera viewpoint in the initial arrangement position. FIG. 6 is a schematic view showing an example of the green displayed on the display unit 102 in the present embodiment, and FIG. 7 shows an example of the initial image.

Figure 7:
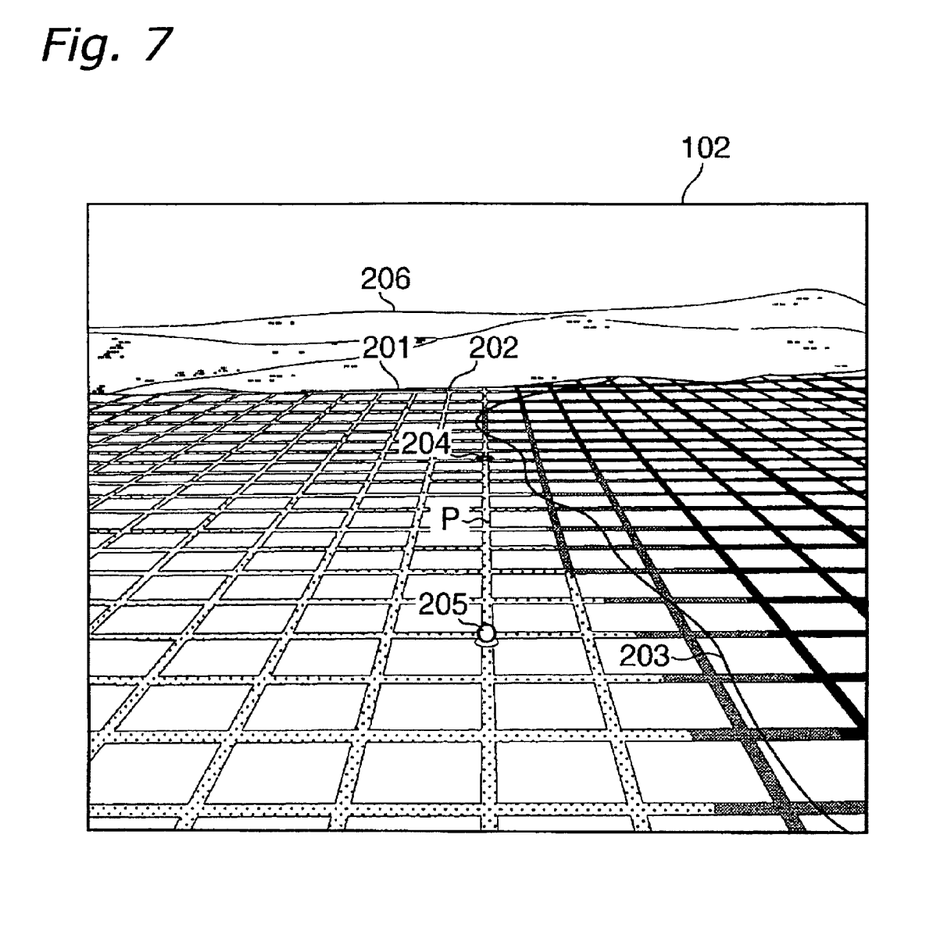
FIG. 7 shows one example of an initial image.

As shown in FIGS. 6 and 7, the green 201 is displayed in a state in which the gridlines 202 are colored. As noted above, the color of the gridlines 202 is set to red to indicate the highest high portion, and set to blue to indicate the lowest low portion. Then, the colors from the highest high portion to the lowest low portion are expressed with colors that are gradated from red to blue. In other words, a player can determine that the height of a green is gradually decreasing by colors that change from warm to cold. Here, the darker the color of the gridlines 202 become in FIGS. 6 and 7 (and FIGS. 8 and 9), the more warm the colors become. Thus, in FIG. 6, the right portion of the green 201 is the highest portion, and the height gradually decreases therefrom toward the left portion. In addition, the translucent wave 203 is displayed on the green 201, and spreads out from the high portion to the low portion. In FIG. 6, the translucent wave 203 is displayed in a state in which it spreads out to the position of the dotted line 203a. The translucent wave 203 is repeatedly displayed so as to spread over the entire green 201.

In FIG. 7, the camera viewpoint is in the initial arrangement position, and thus the green 201 is displayed on the display unit 102 in a state in which the cup is seen from the golf ball 205 side, and the golf ball and the cup are viewed as if on a straight line. Note that the rotation reference point P is not displayed on the display unit 102, but appears in the figures for the sake of convenience. The gridlines 202 on the right side portion of FIG. 6 have the darkest color, and the color thereof gradually lightens from the right side portion toward the left side portion. At this time, the translucent wave 203 also is displayed so as to spread out from the right side to the left side. Thus, a player can understand that the height of the green 201 gradually decreases from the right side portion toward the left side. Note that the fairway 206 is displayed on the periphery of the green 201.

Referring to FIG. 5, the operation determination means 111 will, via the operation unit 101, determine whether or not a player has tilted the angle designation stick by means of a camera arrangement command input by a player who tilts the angle designation stick to a predetermined tilt angle or greater. The tilt angle here is a value from zero to 128, and these values indicate the degree of tilt of the angle designation stick. Here, if we assume that the predetermined tilt angle is 10, the operation determination means 111 will detect whether or not the angle designation stick is tilted to a tilt angle of 10 or greater. If it is not determined that the angle designation stick is tilted by means of the camera arrangement command (S3 is NO), Step S5 will be executed, based upon the initial position coordinates of the initial arrangement position of the camera viewpoint and the rotation reference point P stored in the storage unit 104 as camera arrangement data D2.

Note that in the event that Step S4 (described below) is executed and the camera arrangement data D2 has been previously modified, and it was not determined that the angle designation stick is tilted by means of the camera arrangement command, a process identical to Step S1 will be performed again, and the initial arrangement position will be calculated. The camera viewpoint position coordinates of the camera arrangement data D2 at this time will be changed to the initial arrangement position, and then Step S5 will be executed. In other words, if a player has not operated the angle designation stick, the camera viewpoint will be set to the initial arrangement position.

If it is determined that a camera arrangement command has been received (S3 is YES), the operation determination means 111 will determine the direction in which the angle designation stick is tilted from the camera arrangement command, and a camera arrangement position signal that indicates this direction will be output to the camera position setting means 112. The camera position setting means 112 will set the camera viewpoint position to be the position on a circle centered around the rotation reference point P that corresponds to the tilt direction of the angle designation stick indicated by the camera arrangement position signal. The camera viewpoint position is stored in the storage unit 104 as camera arrangement data D2 (S4). Step S5 is executed thereafter.

The operation determination means 111 will determine, via the operation unit 101, whether or not the player has changed the height position by means of the camera arrangement command input by the player pushing the height designation buttons. If it is determined that the height position has been changed by means of the camera arrangement command (S5 is YES), the operation determination means 111 will transmit a camera arrangement position signal to the camera position setting means 112 that indicates the length of time that the height designation buttons have been pushed. The camera position setting means 112 will set the height position of the camera viewpoint to the camera position in accordance with the length of time indicated by the camera arrangement position signal, and will store the height position of the camera viewpoint to the camera arrangement data D2 of the storage unit 104 (S6).

If it is not determined that the height position has been changed by means of a camera arrangement command (S5 is NO), the height position of the camera viewpoint of the camera arrangement data D2 stored in the storage unit 104 will not be changed, and Step S7 will be executed. In Step S7, the operation determination means 112 will determine whether or not there has been a change in the distance A, i.e., whether or not the player has struck the golf ball. If it is determined that there has been a change in the distance A (Step S7 is YES), then Step S8 will be executed, the distance L, the position of the rotation reference point P, and the camera viewpoint arrangement position will be newly set, and this data will be stored as camera arrangement data D2 in the storage unit 104. The process for seeking the distance L and the position of the rotation reference point P in Step S8 is identical with that of Step S1.

Then, the display control means 113 will display the cup as seen from the arrangement position of the camera in accordance with the camera arrangement data D2, and the green around the periphery thereof, on the display unit 102 as a camera viewpoint image. In other words, in Step S4, if the camera viewpoint position was newly set in accordance with the camera arrangement position signal, the camera viewpoint will be rotationally moved to the camera viewpoint arrangement position newly set as shown for example in FIG. 8, and the camera viewpoint image will be displayed. In addition, in Step S6, if the height position of the camera has been changed and the position of the camera viewpoint has been newly set, then the height position of the camera viewpoint will be changed as shown for example in FIG. 9, and the camera viewpoint image will be displayed. Then, if the distance L has been changed in Step S8, the camera viewpoint distance from the golf ball and the cup will be changed, and the camera viewpoint image will be displayed.

Figure 8:
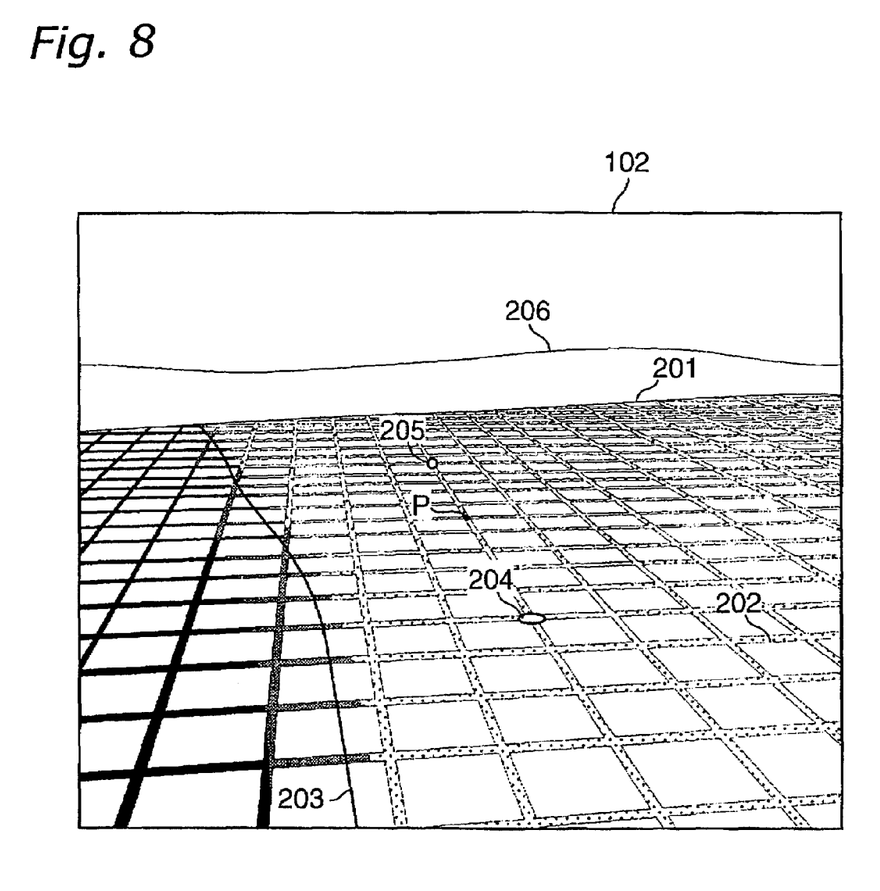
FIG. 8 shows one example of the green that will be displayed with the image display control process shown in FIG. 5 when the camera viewpoint arrangement position is rotated.
Figure 9:
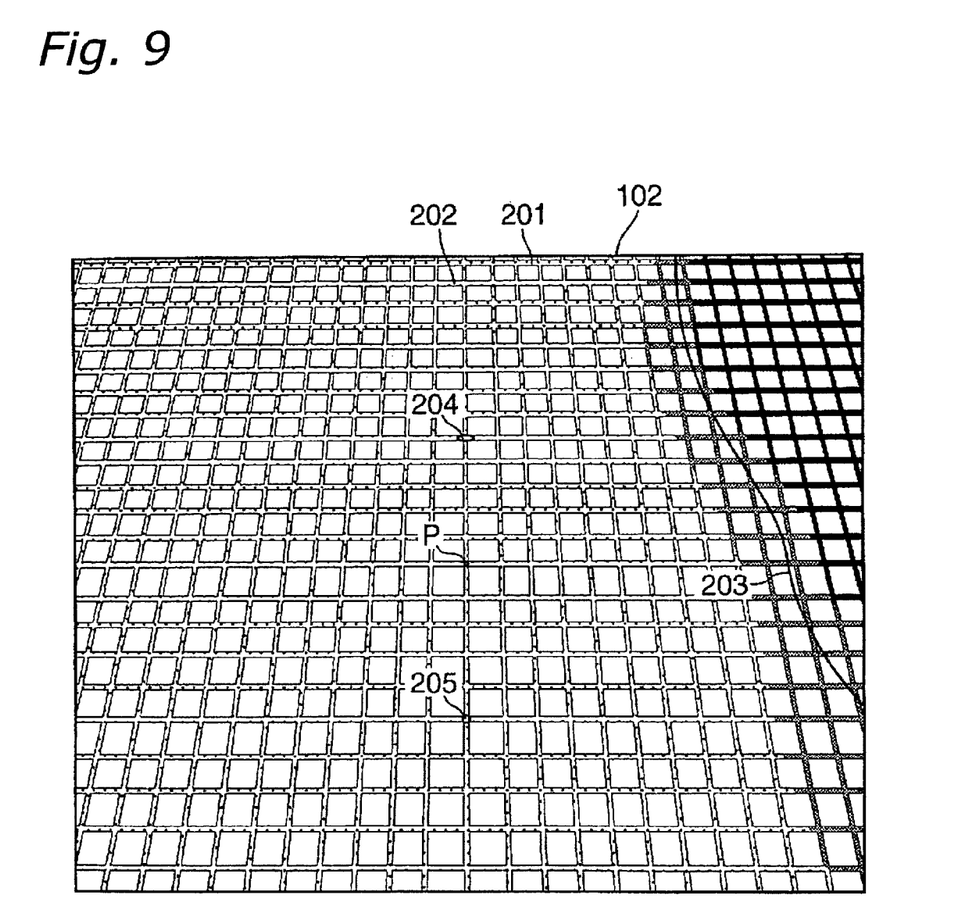
FIG. 9 shows one example of the green that will be displayed with the image display control process shown in FIG. 5 when the camera viewpoint arrangement position is higher than an initial height position.

FIG. 8 shows an example of the green 201 that is displayed when the camera viewpoint arrangement position is rotatively moved by the image display control process shown in FIG. 5, and FIG. 9 shows an example of the green 201 that is displayed when the camera viewpoint arrangement position is raised from the initial height position by the image display control process shown in FIG. 5. In FIG. 8, the camera viewpoint is rotatively moved around the rotation reference point P in Step S4 from the initial position shown in FIG. 7, and is positioned in position X3 shown in FIG. 4. Here, because the camera viewpoint is different from FIG. 7 and the golf ball 205 is seen from the cup 204 side, the green 201 is displayed on the display unit 102 in a state in which the height thereof gradually decreases from the left side portion to the right side portion.

Thus, when the camera viewpoint is rotatively moved around the rotation reference point P based upon the input of the camera arrangement command in Step S4, a camera viewpoint image will be displayed on the display unit 102 during rotation and from the arrangement position to which the camera viewpoint was rotatively moved, and thus the cup 204 and the golf ball 205 on the green 201 can be displayed from various angles. In this way, a player will easily understand the positional relationship of the green 201 and the cup 204. In addition, a player can also view the undulations of the green 201 from various angles and from diagonal directions, and thus the player will easily understand the undulations of the green.

FIG. 9 is a camera viewpoint image displayed from a height position that was changed in Step S6. In the image displayed here, the camera viewpoint position is not rotatively moved by means of Step S4, but only the height position from the initial arrangement position of FIG. 7 is changed by means of Step S6. Thus, by changing the height position of the camera viewpoint by means of Step S6, displaying camera viewpoint images on the display unit 102 in real time while raising or lowering the height position of the camera viewpoint to the changed position, and displaying camera viewpoint images on the display unit 102 from the changed height position, a player can see the cup 204 and the golf ball 205 on the green 201 from various heights, and can easily understand the positional relationship of the cup 204 and the golf ball 205 and the undulations on the green 201.

Referring to FIG. 5, the operation determination means 111 will determine whether or not a camera viewpoint display cancellation command has been input via the operation unit 101 (S10). In the event that it is not determined that a camera viewpoint display cancellation command was input (S10 is NO), Step S3 will be re-executed. On the other hand, in the event that it is determined that a camera viewpoint display cancellation command was input (S11 is YES), the operation determination means 111 will transmit a display designation signal to the camera position setting means 112. Then, the image display control process will be completed when the display of the camera viewpoint mode is cancelled by the camera position setting means 112 which received the display designation signal. After this, the camera position setting means 112 will set the display of the display unit 102 to the standard view mode.

As noted above, with the image display control process according to the present embodiment, a camera viewpoint can be rotatively moved around a rotation reference point P based upon the operation of an angle determination stick by a player, and thus a golf ball and a cup can be displayed on the display unit 102 from a variety of angles. In this way, relationships which include the positional relationship between a golf ball and a cup can be understood by a player. In addition, because the height of the camera viewpoint can be changed by a player in accordance with a camera viewpoint height operation via height designation buttons, a golf ball and a cup can be displayed on the display unit 102 from various heights, and the relationship between a golf ball and a cup can be more easily understood by a player.

Note that if the rotation reference point P is one point on a straight line that links a golf ball and a cup, that point is not necessarily the mid-point of the line, and thus a configuration is possible in which the rotational movement does not occur around a circle that is equidistance from the rotation reference point P, and the distance from the rotation reference point P to the camera viewpoint can be varied via a player operating the operation unit 102. However, as in the present embodiment, if the configuration allows rotational movement to occur around a circle that is equidistance from the rotation reference point P, it can effectively prevent "image sickness" in a player.

In addition, the use of a stick type operation unit 101 that can be tilted 360 degrees is not necessarily required in order to input a camera arrangement command which causes the rotational movement of the camera viewpoint, and buttons and the like may instead be used. Note that the height of the green may be indicated with patterns, gridlines, or the like instead of colors, and it is not necessary that the green have undulations.

Furthermore, the present invention is not just a golf game, and can be applied to a video game in which a plurality of objects are viewed, such as gate ball, billiards, and the like. Note that the present invention may display at least one of a first object and a second object, but it is preferable that both be displayed so that a player can better understand the relationships between the first object and the second object.

Note also that each means described above is implemented by a program having a function that respectively corresponds to each means.

INDUSTRIAL APPLICABILITY

According to the first aspect of the present invention, first and second objects can be displayed from various angles desired by an operator, and thus an operator can view the first and second objects from any of a variety of angles, and an operator can sufficiently understand the relationships of the first and second objects, including the positional relationship.

According to the second aspect of the present invention, by simply tilting the operation unit at a desired angle, an operator can display the first and second objects from the angle desired, and can see an image from a desired position with a simple operation.

According to the third aspect of the present invention, first and second objects can be displayed from a height desired by an operator, and thus an operator can view the first and second objects from any of a variety of angles and heights, and an operator can more effectively understand the relationships of the first and second objects, including the positional relationship.

According to the fourth aspect of the present invention, because it is possible to display at least one of the first and second objects on the display unit while rotating the periphery thereof from a camera viewpoint that rotatively moves in accordance with the operation of the operation unit by an operator, an operator can more effectively understand the relationships of the first and second objects, including the positional relationship.

According to the fifth aspect of the present invention, first and second objects can be displayed from various angles desired by an operator, and thus an operator can view the first and second objects from any of a variety of angles, and an operator can sufficiently understand the relationships of the first and second objects, including the positional relationship.

According to the sixth aspect of the present invention, first and second objects can be displayed from various angles desired by an operator, and thus an operator can view the first and second objects from any of a variety of angles, and an operator can sufficiently understand the relationships of the first and second objects, including the positional relationship.

What is claimed is:

1. A computer readable medium encoded with a computer program for displaying a plurality of objects on a display unit of a video game device from a plurality of angles, the computer program comprising:
   code for receiving an operation from an operator via an operation unit;
   code for annularly moving a camera viewpoint, in accordance with the operation, with respect to a reference point as a center, the reference point being selected from at least two points on a straight line linking a first object and a second object among the plurality of objects; and
   code for displaying at least one image of the first and second objects from the camera viewpoint after being moved.

2. The computer readable medium encoded with the computer program according to claim 1, the computer program further comprising
   code for determining a tilt direction of the operation unit, wherein
   the camera viewpoint is moved in accordance with an angle corresponding to the tilt direction.

3. The computer readable medium encoded with the computer program according to claim 1, the computer program further comprising
   code for receiving a camera viewpoint height operation from the operator to adjust the height of the camera viewpoint, and
   code for adjusting the camera viewpoint to the height based upon the camera viewpoint height operation.

4. The computer readable medium encoded with the computer program according to claim 1, wherein
   the reference point is located closer to the first object than to the second object, and
   the length between the first object and the second object is shorter than the length between the reference point and the second object.

5. The computer readable medium encoded with the computer program according to claim 1, wherein
   the reference point is located closer to the first object than that to the second object, and
   the length between the first object and the second object is longer than the length between the reference point and the second object.

6. The computer readable medium encoded with the computer program according to claim 1, wherein
   the reference point is selected by the operator.

7. A computer readable medium encoded with a computer program for displaying a plurality of objects on a display unit of a video game device from a plurality of angles, the computer program comprising:
   code for receiving an operation from an operator via an operation unit;
   code for annularly moving a camera viewpoint, in accordance with the operation, around a reference point as a center, the reference point being selected from at least two points on a straight line linking a first object and a second object among the plurality of objects; and
   code for displaying at least one of the first and second objects on the display unit from the camera viewpoint after being moved.

8. An image display control method for displaying a plurality of objects on a display unit of a video game device from a plurality of angles, comprising:
   receiving an operation in the video game device from an operator via an operation unit;
   moving a camera viewpoint, in accordance with the operation, with respect to a reference point as a center, the reference point being selected from at least two points on a straight line linking a first object and a second object among the plurality of objects; and
   displaying on the display unit of the video game device at least one image of the first and second objects from the camera viewpoint after being moved.

9. The image display control method according to claim 8, wherein
   the reference point is located closer to the first object than that to the second object, and
   the length between the first object and the second object is shorter than the length between the reference point and the second object.

10. The image display control method according to claim 8, wherein
    the reference point is located closer to the first object than to the second object, and
    the length between the first object and the second object is longer than the length between the reference point and the second object.

11. An image display control device which displays a plurality of objects on a display unit from a plurality of angles, comprising:
    an operation reception means which receives an operation from an operator via an operation unit;
    a camera viewpoint movement means that causes a camera viewpoint to move, in accordance with the operation received by the operation reception means, with respect to a reference point as a center, the reference point being selected from at least two points on a straight line linking a first object and a second object among the plurality of objects; and
    a camera image display control means that causes at least one of the first and second objects to be displayed on the display unit from the camera viewpoint after being moved by the camera viewpoint movement means.

* * * * *